United States Patent [19]

Minogue

[11] 4,108,560
[45] Aug. 22, 1978

[54] SIGN MOUNTING FASTENER

[75] Inventor: Robert Willis Minogue, Hayward, Calif.

[73] Assignee: Federal Signal Corporation, Chicago, Ill.

[21] Appl. No.: 759,597

[22] Filed: Jan. 14, 1977

[51] Int. Cl.² .................. F16C 11/00; F16D 1/12; F16D 3/00
[52] U.S. Cl. .................................. 403/33; 29/407; 29/526 R; 40/602; 85/42; 403/407
[58] Field of Search ............... 29/526, 407; 85/42; 40/125 R, 125 A; 403/407, 27, 307, 33, 308

[56] References Cited

U.S. PATENT DOCUMENTS

| | | | |
|---|---|---|---|
| 184,718 | 11/1876 | Lewis | 85/42 UX |
| 1,564,715 | 12/1925 | Russell | 403/407 |
| 1,945,806 | 2/1934 | Flora | 40/125 R |
| 2,312,185 | 2/1943 | Neunherz | 85/42 UX |
| 3,276,172 | 10/1966 | Alvden | 85/42 X |
| 3,741,594 | 6/1973 | Ostling | 403/407 |
| 3,868,800 | 3/1975 | Peterson | 403/408 X |

FOREIGN PATENT DOCUMENTS

| | | | |
|---|---|---|---|
| 1,317,529 | 1/1963 | France | 85/42 |
| 518,927 | 3/1955 | Italy | 85/42 |

*Primary Examiner*—Charlie T. Moon
*Attorney, Agent, or Firm*—Townsend and Townsend

[57] ABSTRACT

A specialized sign fitting together with the process of using said sign fitting to install signs on sign supports, such as walls, is disclosed. The specialized sign fitting includes a threaded male member having a protruding attachment member, such as a wood screw, for fastening to the back of the sign. The fitting has an overlying female member having the external configuration of a bolt. This mounted bolt configured female member is used to rotate and fasten the male member at the protruding attachment member into the sign. With a plurality of fasteners installed on the back of the sign, the female members are removed to expose male member mounted scribes. In the shop, these male member mounted scribes are then impressed with the sign itself onto a sign mounting templet. In the field, the templet containing both the scribed locations of the sign fasteners as well as typically an outline of the sign is first hung on the sign mounting location. The female members are then mounted through the templet in precise registry with the male members on the back of the sign. The sign is then confronted to the mounting and the female members rotated in the narrow interstices between the sign mounting and the sign back. Such rotation is preferably made by wrapping a wound thread around the female member and rotating the female member onto the male member by pulling and unwinding the thread. A firm sign mount attractively spaced from the wall by the depth of the female members results.

7 Claims, 7 Drawing Figures

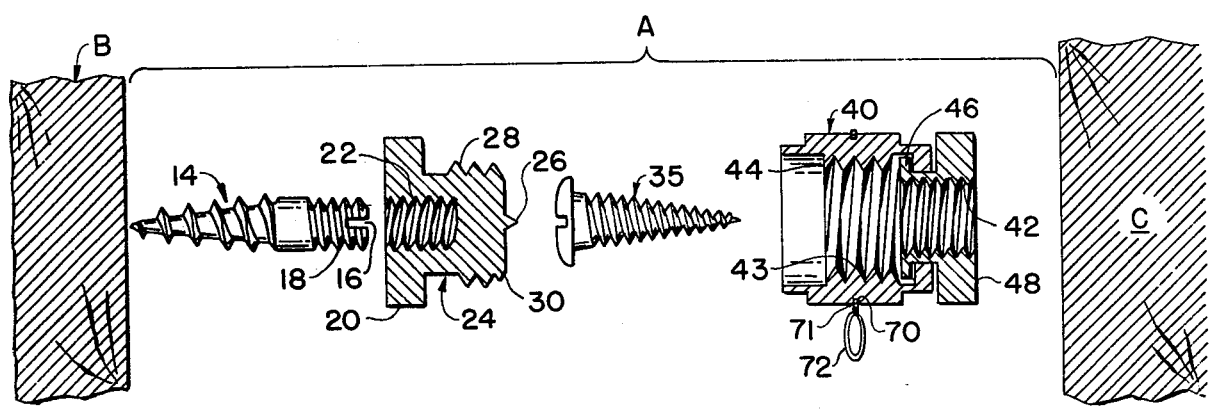
FIG.—1A.
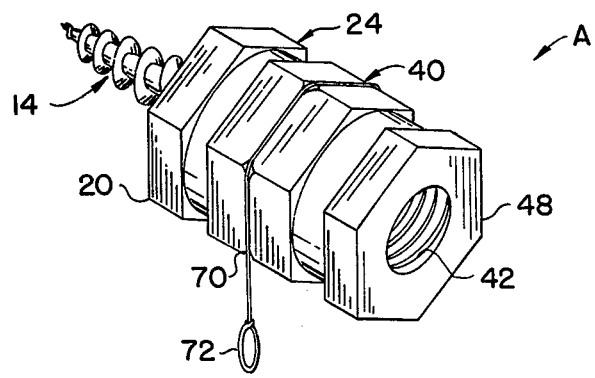
FIG.—1B.
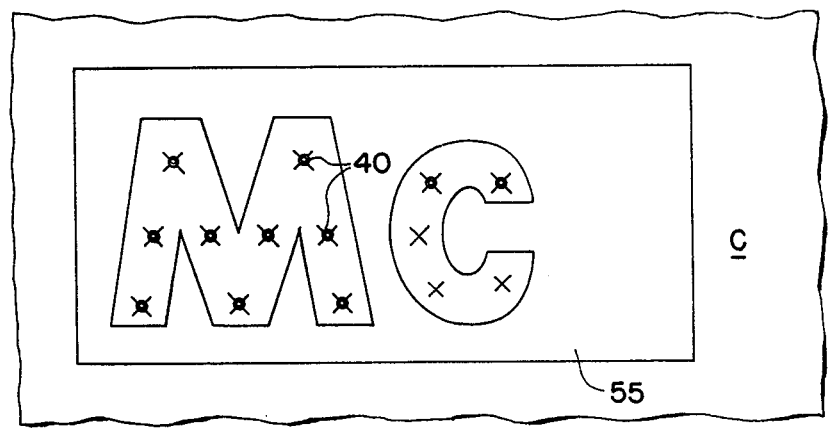
FIG.—4.

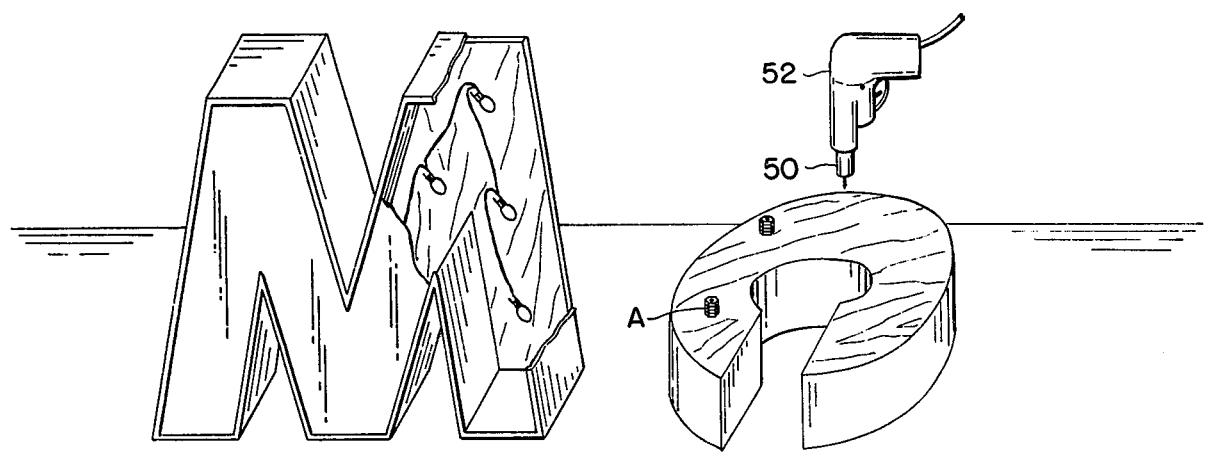
FIG._2.
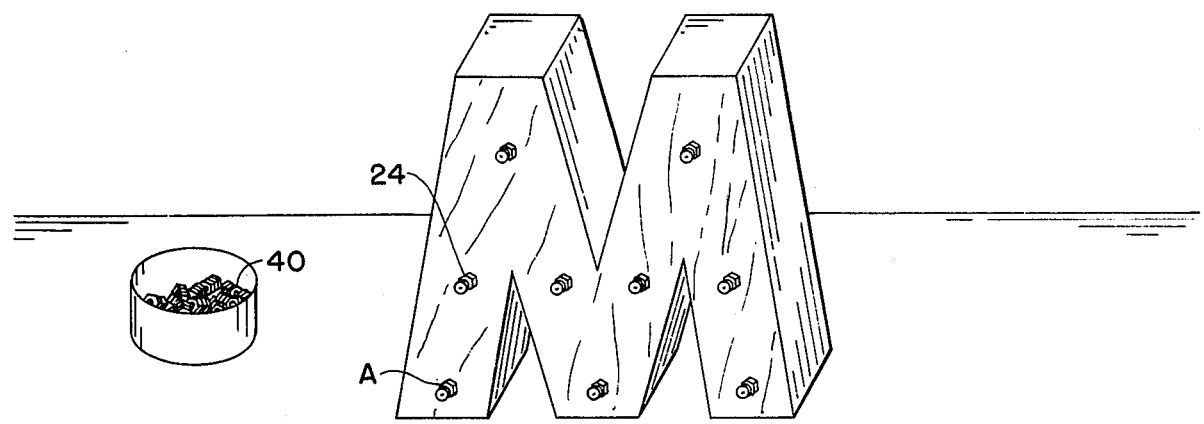
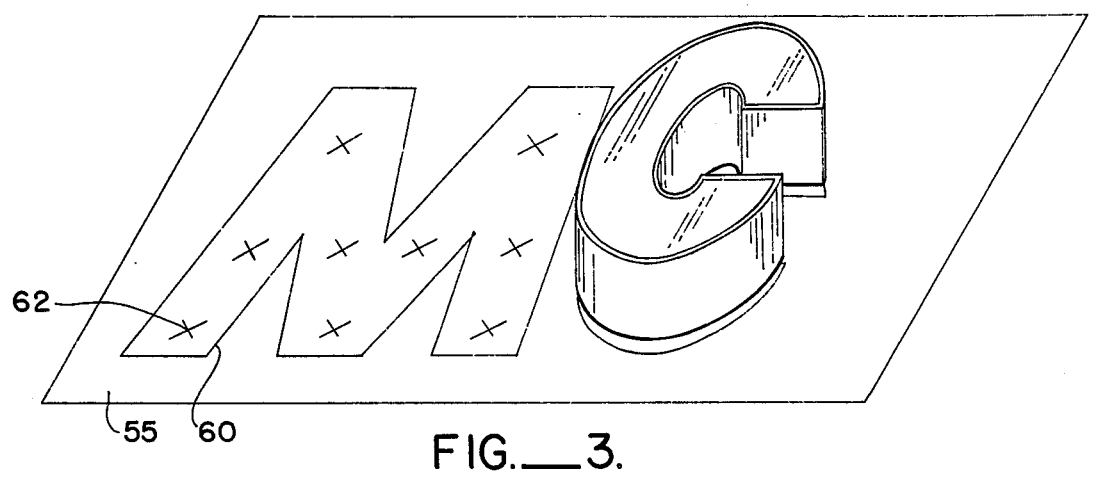
FIG._3.

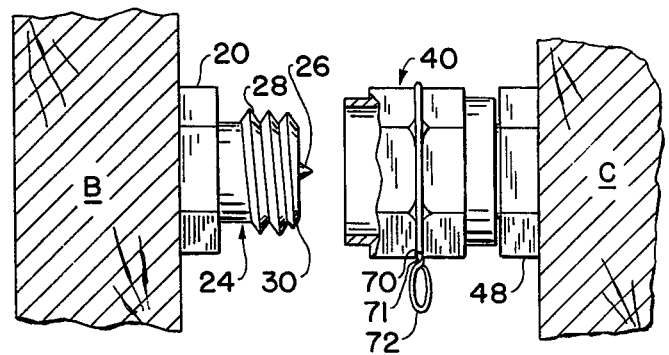
FIG._5A.
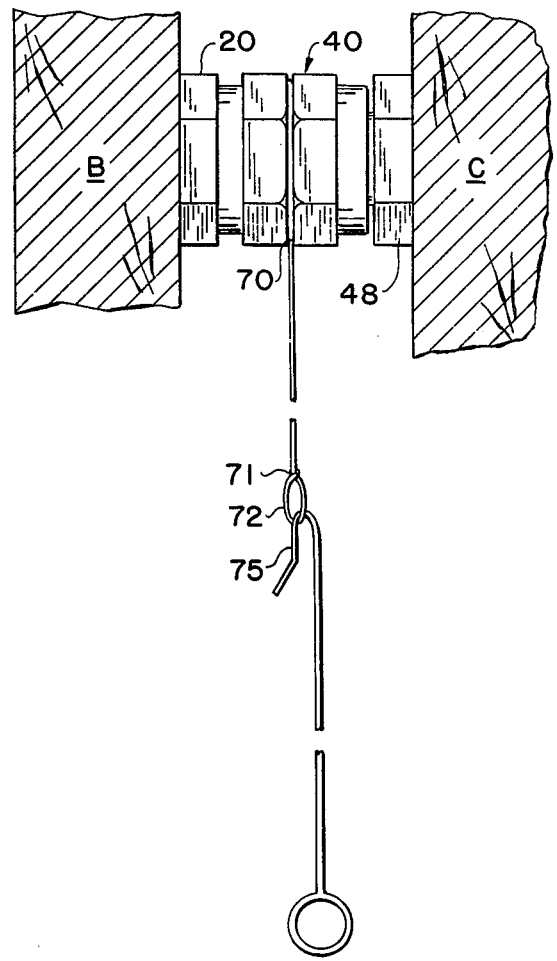
FIG._5B.

SIGN MOUNTING FASTENER

This invention relates to the mounting of signs. Preferably, enclosed signs having electrical working parts are mounted in a sealed disposition to a sign mount, such as a building wall, by the specialized sign mount apparatus and method of this invention.

SUMMARY OF THE PRIOR ART

Conventional signs usually include enclosed reflective housings having removable translucent faces. Mounting of the signs heretofore has required removal of their translucent faces at least two separate times. One removal is typically in the shop. During the shop removal, fasteners are placed from the inside of the sign through the back of the sign. In such fastener placement, the delicate internal electrical parts are exposed. Typically the sign is then enclosed by remounting of its translucent face and shipped to the field.

In the field the sign is opened again by removal of the translucent face. With the translucent face removed, the sign is held in juxtaposition to its mounted location. Supporting fasteners are installed to the wall through the open sign. When the fasteners are secure, the translucent face is mounted and the sign left on location.

These procedures include serious disadvantages. First, the inner exposed workings of signs are expensive and dangerous. They include blown neon tubes produced by skilled workers at great costs, which neon tubes are readily broken during the fastening. Moreover, when these neon tubes are connected to electrical sources, as in the initial connection and testing of an electrical sign, they present a safety hazard. Common voltages associated with such neon tubes include voltages in the range of 5,000 volts.

SUMMARY OF THE INVENTION

A specialized sign fitting together with the process of using said sign fitting to install signs on sign supports, such as walls, is disclosed. The specialized sign fitting includes a threaded male member having a protruding attachment member, such as a wood screw, for fastening to the back of the sign. The fitting has an overlying female member having the external configuration of a bolt. This mounted bolt configured female member is used to rotate and fasten the male member at the protruding attachment member into the sign. With a plurality of fasteners installed on the back of the sign, the female members are removed to exposed male member mounted scribes. In the shop, these male member mounted scribes are then impressed with the sign itself onto a sign mounting templet. In the field, the templet containing both the scribed locations of the sign fasteners as well as typically an outline of the sign is first hung on the sign mounting location. The female members are then mounted through the templet in precise registry with the male members on the back of the sign. The sign is then confronted to the mounting and the female members rotated in the narrow interstices between the sign mounting and the sign back. Such rotation is preferably made by wrapping a wound thread around the female member and rotating the female member onto the male member by pull-ng and unwinding the thread. A firm sign mount attractively spaced from the wall by the depth of the female members results.

OTHER OBJECTS AND ADVANTAGES OF THE INVENTION

An object of this invention is to disclose a sign mounting process which does not require opening of the sealed sign with inner electrical workings in either the shop or field. Typically, sign mounted male fasteners with scribes are used to mark a templet. This templet marking occurs by first mounting the male fasteners to the back of the sign, and thereafter using the entire sign to impress the fasteners at exposed fastener mounted scribes onto a sign templet. The templet, typically having the outline of the entire sign drawn thereon, is hung in the field on the sign mounting location. Female fasteners are mounted through the templet to the sign mounting location, such as the wall of a building, in precise registry with the male members on the sign back. Thereafter, the sign is juxtaposed to the wall over the templet and the female fasteners rotated to produce a threaded connection and mounting of the sign to the wall. Tearing of the templet away from the interstices between the sign and wall finishes the mounting of the sign.

An advantage of the process herein disclosed is that a sign once fabricated with its delicate internal electrical assemblies can be left sealed. This sealing can remain during substantially all of the sign mounting process. The sign remains sealed in the shop where fasteners are originally applied and sealed in the field when the sign is installed and supported in its location.

A further advantage of the sign mounting process is that the steps of opening the sign, exposing the sign, working through the exposed back of the sign and closing the exposed sign are all omitted. These steps are omitted in the shop and they are likewise omitted in the field. Considerable time saving results.

Yet a further advantage of the templet of this invention is that the mounting of the sign fasteners to the wall does not have to be made while any part of the weight of the sign is supported in its mounted location. Rather, by the simple expedient of mounting a templet on the location and placing fasteners through the templet can the sign support be readied for the sign. It should be noted that the full weight of the sign only need be supported for the few moments before the fasteners of this invention affect the permanent fastening of the sign to the wall.

A further object of this invention is to disclose a specialized sign mounting fastener useful in the field sign mounting process. Specifically, a male member with exposed scribes has protruding therefrom a conventional sign mounting apparatus such as a wood screw for mounting to the back of the sign. The female member threads over the male member and is typically provided with a hexagonal bolt exterior contour. This female member is first used in a conventional socket to mount the male fastening member to the sign. It is then removed for scribing of the sign templet in accordance with this invention. In the field, the female member is mounted independently of the male member through a wall mounted templet to support the sign. Finally the female member, typically connected by a rotatable swage fitting to a wall fastener, is rotated to fasten the sign firmly onto the sign support.

An advantage of this sign mount is that a simple, inexpensive sign fitting solves the problem of field placement of signs having delicate internal electrical connections.

A further advantage of this invention is that the female member can be adapted for wall mounting by a full vocabulary of conventional wall mounts. Where the wall sidings are wood, wood screws can be used. Where the wall sidings are plaster and the like, conventional wallboard screws can be used. In short, virtually any mounting can be utilized with fittings of this invention for sign mounting.

Yet another advantage of the female member is that its depth forms a convenient spacer of the sign from the face of the wall. This produces an attractive and firm sign mounting.

A further advantage of the female member is that it is given an exterior socket configuration. This socket configuration enables the fastener to be freely held in a socket wrench as it is installed in the shop. Moreover, a hexagonal bolt configuration is readily adapted to rotation by wrenches and the like in the narrow interstices between the sign mount and the sign back.

Yet another advantage is that the bolt configuration of the female member permits rapid fastener installation on the wall.

A further advantage of the female member is that it protects the male member in transport. By the expedient of threading the female member over the male member during transport of the sealed sign to the field, not only is the female member transported with the sign, but the female member acts to protect the protruding male member and its exposed thread and scribe.

A further object of this invention is to provide for rotation of the female member in the narrow interstices between the sign back and sign support. In accordance with this embodiment, a thread with coated adhesive is wound about the female member. This thread is held immediately would about the female member during all transport and handling of the fastener of this invention. When it is pulled to unwind from about the female member in the field, it causes the female member to rotate and engage threads on the male member. This rotation and engagement occurs in the narrow interstices between the sign back and wall mount.

An advantage of this aspect of the invention is that the thread effects winding of the female member to the male member in gross. Only when the final tightening is required need wrench rotation of the sign fastener occur.

A further advantage of this aspect of the invention is that the releasable glue on the thread conveniently holds the thread immediately about the female member.

A further object of this invention is to provide a tool to rotate the female member of the sign fastener in the narrow interstices between the sign mount and sign back. According to this aspect of the invention, a knot is tied in the thread immediately wound about the female member. The thread is typically depended a small distance away from the female member. When the sign is juxtaposed to the sign mount with the male and female members registered, a tool for grasping the thread above the knot is passed into the narrow interstices. When the thread is grasped, it is pulled. Rotation of the female member and engagement of the male member results.

An advantage of this aspect of the invention is that rotation of the female member to grasp the male member easily occurs. Only final wrench tightening is required to fasten the sign to the sign back.

Other objects, features and advantages of this invention will become more apparent after referring to the following specification and attached drawings in which:

FIG. 1a is an exploded view illustrating a sign back, the male sign member of this invention, the intervening templet between the male and the female member, the fastener of the female member to the wall, the female member, and finally the wall;

FIG. 1b is an assembled perspective view with the socket of a socket wrench shown overlying the fastener for its placement on a sign back;

FIG. 2 is a perspective illustration showing the letters MC each with a plurality of fasteners fastened to their back with the letter M here shown broken away to illustrate its inner electrical workings;

FIG. 3 is an illustration showing the letters MC being used to scribe a templet with the letter M already having scribed templet and the letter C being placed to scribe templet, the templets and letters here being worked on a horizontal table;

FIG. 4 illustrates the templet hung on a sign location on a vertical wall surface showing the letter M in place and the letter C about to be placed to female members previously mounted to the wall through the templet;

FIG. 5a shows the same letter C before fastener engagement between the male and female members; and FIG. 5b shows the letter C after fastening between the male and female members.

Referring to FIG. 1a, a specialized sign fitting is shown at A. This fitting mounts a sign B (shown at the back portion only) to a sign support C, here illustrated as a wall.

The fitting includes an attachment member 14 which is here shown as a tapered wood screw. Wood screw 14 has at its driving end a screwdriver slot 16. Unlike the conventional wood screw, screw 14 is not provided with a flared head. Rather, it has a threaded head 18 provided with machine screw threading. As will hereinafter become more apparent, this threaded head 18 fits interior of male member 20.

Male member 20 comprises a hexagonal bolt skirt and defines interior thereof a female aperture 22. Female aperture 22 is provided with machined threads which are complementary to threads 18 of wood screw 14. The male attachment member has a boss 24 with a central protruding scribe 26. Scribe 26 is the member which will scribe the templet as will hereinafter be made more apparent.

Boss 24 is provided with threads 28. These threads are provided with a self-threading shoulder 30 which enters the threads in the female member 40.

A female attachment member 35 is illustrated. This is here shown in the form of a wood screw for attaching the female member to a wood wall C.

It will be understood that the attachment member 35 can take any number of varying configurations. For example, it could be a wallboard screw, nail, or even a specialized screw such as the attachment member 14 to fit with threads 42 mounted to the female member 40.

Female member 40 comprises a rotatable bolt having a hexagonal configuration with internal threads 43. Internal threads 43 are provided with a female self-threading shoulder 44. As will hereinafter become more apparent, the female self-threading shoulder 44 mates with the male self-threading shoulder 30 to introduce threads 28 and 43 in threaded engagement.

Male and female threaded members here shown are only preferred. Any number of conventional couplings could be used.

Female attachment member 40 is provided with an external bolt configuration. As shown in the perspective of FIG. 1b, the completely assembled unit has on its exterior a bolt configuration. This bolt configuration permits the installation of the fastener to the back of the sign with a socket wrench.

It will be noted that female member 40 is fixed by a flared boss 46 to a wall mount member 48. Like female attachment member 40, wall mount member 48 is provided with a hexagonal bolt configuration. It freely turns on the female member 40 so that relative rotation between members 40 and 48 is assured. It should be pointed out that when the female attachment member 35, such as the wood screw herein illustrated, is pulled against wall mount member 48, rotation of the member 40 freely occurs. Additionally, the flared boss 46 provides member 40 with a measure of axial alignment; member 40 can move to correct minute amounts of misalignment as the threaded attachment to male member 24 occurs.

It has been found convenient to scribe a channel 70 around the medial portion of the hexagonal bolt 40. Member 70 has wound within it an eight-pound nylon fishing leader 71 having a loop or knot 72 placed in the end thereof. Before leader 71 is wound, it is typically dipped in a glue so that, as wound, the thread 71 is firmly captured within the groove 70. Typically, it is fastened at its bitter end (not shown in the view of FIGS. 1a or 1b) to the bolt.

Referring to FIG. 1b, the fastener of this invention is shown in perspective. It is shown without the female attachment member 35 protruding from the assembled unit. It can be seen that the entire member presents a hexagonal bolt configuration which fits into a socket 50 mounted to an air or electrical driven drill 52 of the impact variety. (See FIG. 2.)

Having set forth the full construction of the attachment fastener in FIGS. 1a and 1b, attention can now be directed to the following sequence of drawings which illustrate use of the fastener.

Referring to FIG. 2, the letters MC are illustrated. The letter M is exposed to illustrated inner exposed electrical workings, here shown as a series of electrical lightbulbs. The inner electrical workings could just as well include high voltage neon tubes, flourescent tubes, or the like. The important point to understand is that it is desirable to mount the letter in a sealed disposition. Opening of the letter to expose the inner electrical workings either in the shop or in the field for mounting is not desirable.

Referring to the right-hand segment of FIG. 2, the letter C is shown lying translucent face down on a work surface, such as a work bench. An overlying impact drill 52 with a socket mount 50 is shown in the process of installing the fastener of FIG. 1a into preselected locations on the back of the sign C. Typically, these locations are chosen at random with the support of the letter being the only consideration.

Referring to FIG. 3, a sign templet 55 is shown again placed over a work surface. The letter M with the protruding fastener A is shown having previously scribed the templet 55. It will be noted that the fasteners have each had their female members 40 removed, exposing the male fastening member 24 in the scribe 26. The letter M has been impressed on the templet and removed. While the letter was in place on the templet an outline 60 of the letter on the templet was made. Letter C is shown being placed and impressed on the templet.

In placement on the templet, the scribe 26 on the male member 24 punctures or otherwise marks the templet in locations corresponding to their location. These scribe marks have been reinforced by X's drawn showing the place of precise puncture of the templet.

Before shipping of the letters and templet to the field, the female members 40 are typically threaded back over the male members 24. This threading enables the threads and scribes to the male members to be shipped in a protected disposition. As the female member 40 only exposes its hexagonal bolt configuration, the female member serves the serendipitous purpose of protecting the fasteners during shipment.

Referring to FIG. 4, the templet 55 is shown hung on the sign supporting surface C. Female members 40 have each been removed from the letters and mounted by conventional wall fasteners or attachment members 35 through the templet to the sign support C. This mounting has occurred right through the templet and places the female members 40 in precise registry with the anticipated location of the lettering.

Referring to FIG. 5a, the letter C in the vicinity of a pair of fasteners is illustrated. As can be seen, the back B of the letter C is being brought into registry with the fastener so that the male member 24 moves to approach the female member 40 on each of the respective fasteners.

FIG. 5b illustrates the fastener of this invention with the special threaded engagement apparatus. In FIG. 5b it can be seen that knot or loop 72 is being grasped by a tool, here shown as a bent wire, and being pulled. When loop 72 is pulled, the adhesive bound leader 71 pulls away from groove 70. As leader 71 is pulled, the respective threads 28 on male member 20 and 43 on female member 40 are making a threaded engagement. This threaded engagement continues and can occur because of the self-threading male shoulder 30 on male member 20 and the female shoulder 44 on female member 40 effect self-alignment. As female member 40 is mounted for free rotation on the wall mount member 48, threaded engagement in gross easily occurs.

Once threaded engagement in gross is made as to all the fasteners, they are typically finally fastened in place with an elongate narrow wrench, such as a conventional tappet wrench. The conventional tappet wrench engages the outside surface of the hexagonal bolt configuration of female member 40 and causes it to be rotated. As it is rotated, firm fastening of the fastener in the narrow interstices between the letter and sign support occurs.

It will be appreciated that the preferred embodiment here shown is only exemplary. Departure may be made from the design here shown without departing from the spirit and scope of this invention. For example, the threaded coupling here shown can be changed. The male and female members can be reversed. Likewise other changes can be made from the preferred embodiment here shown.

I claim:

1. A sign fastener comprising a male mounting member; said male member including protruding attachment means for mounting to a surface; a female mounting member; coupling means for connecting said female mounting member to said male mounting member upon relative rotation of said coupling means; said female mounting member defining an aperture for permitting a fastener to pass there through to hold said female mounting member to a surface; relative rotation means on one of said mounting members to permit rotation of said coupling means relative to said mounting members to effect fastening of said sign; and, a scribe mounted to one of said members to permit said members to impress a mark indicating its location on a surface.

2. The invention of claim 1 and wherein said scribe is mounted to said first male member.

3. The invention of claim 1 and wherein said coupling means is wound with a thread, said thread coated with an adhesive as wound to hold said thread as wound about said female mounting member.

4. The invention of claim 1 and wherein said protruding attachment means for mounting to a surface includes a wood screw.

5. A sign fastener comprising: a first male mounting member; said male member having attachment means for attaching said member to a sign back; said male member having male threads defined over the surface thereof with a self-threading male shoulder; said male member further including a scribe mounted centrally of and protruding from said male member to permit said male member to impress a mark indicating its location on a sign support surface; a female mounting member including an exterior hexagonal bolt configuration and an attached wall mount member having a hexagonal bolt configuration; said female mounting member defining interiorly thereof threads complementary to the threads of said male mounting member and having a self-threading female shoulder thereon; means for attachment of said attached wall mount member to said sign support surface; and, means for permitting relative rotation of said female mounting member relative to said attached wall mount member to effect coupling of said male and female members.

6. The fastener of claim 5 and wherein said female mounting member is formed with a groove; a thread attached at one end of said groove and extending therefrom; and, said thread wound coated with an adhesive in the groove of said female member.

7. The invention of claim 5 and wherein said thread is provided with a knot at the end thereof.

* * * * *